United States Patent
Gurelli et al.

(10) Patent No.: US 12,500,656 B2
(45) Date of Patent: Dec. 16, 2025

(54) COMPENSATION FOR AN INTELLIGENT REFLECTING SURFACE

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 17/649,023

(22) Filed: Jan. 26, 2022

(65) Prior Publication Data
US 2023/0291460 A1   Sep. 14, 2023

(51) Int. Cl.
*H04B 7/145*   (2006.01)
*H04B 7/0456*   (2017.01)

(52) U.S. Cl.
CPC .......... *H04B 7/145* (2013.01); *H04B 7/0456* (2013.01)

(58) Field of Classification Search
CPC ...... H01Q 15/148; H01Q 19/104; H01Q 3/46; H04B 7/04013; H04B 7/0456; H04B 7/0617; H04B 7/063; H04B 7/145; H04B 7/15528
See application file for complete search history.

(56) References Cited

U.S. PATENT DOCUMENTS

| | | | | |
|---|---|---|---|---|
| 2022/0014935 | A1* | 1/2022 | Haija | H04L 5/0048 |
| 2022/0321198 | A1* | 10/2022 | Devoti | H04B 7/04013 |
| 2022/0407222 | A1* | 12/2022 | Zhu | H04W 24/10 |
| 2023/0318177 | A1* | 10/2023 | Zhou | H04B 7/04013 |
| | | | | 455/456.1 |
| 2023/0421209 | A1* | 12/2023 | Jiang | H04W 24/02 |
| 2024/0072848 | A1* | 2/2024 | Luo | H04B 7/04026 |
| 2024/0080067 | A1* | 3/2024 | Jiang | H01Q 15/002 |

FOREIGN PATENT DOCUMENTS

WO   2022015965 A1   1/2022

OTHER PUBLICATIONS

International Search Report and Written Opinion—PCT/US2022/080838—ISA/EPO—Jun. 9, 2023.
Xu S., et al., "Subreflectarrays for Reflector Surface Distortion Compensation", IEEE Transactions on Antennas and Propagation, IEEE, USA, vol. 57, No. 2, Feb. 1, 2009, pp. 364-372, XP011254041, ISSN: 0018-926X, The whole document.
Partial International Search Report—PCT/US2022/080838—ISA/EPO—Apr. 5, 2023.
Peng Z., et al., "Robust Transmission Design for RIS-Aided Communications with Both Transceiver Hardware Impairments and Imperfect CSI", IEEE Wireless Communications Letters, ARXIV.ORG, Cornell University Library, 201 Olin Library Cornell University Ithaca, NY 14853, Dec. 12, 2021, XP091116530, pp. 1-6.

\* cited by examiner

*Primary Examiner* — Nguyen T Vo
(74) *Attorney, Agent, or Firm* — Patterson & Sheridan LLP

(57) ABSTRACT

Certain aspects of the present disclosure provide techniques for compensating for certain characteristic(s) of an intelligent reflecting surface (IRS). A method that may be performed by a first wireless node includes obtaining an indication of a correction for an IRS to compensate for one or more characteristics of the IRS and communicating with a (Continued)

second wireless node via the IRS using the indication of the correction.

30 Claims, 12 Drawing Sheets

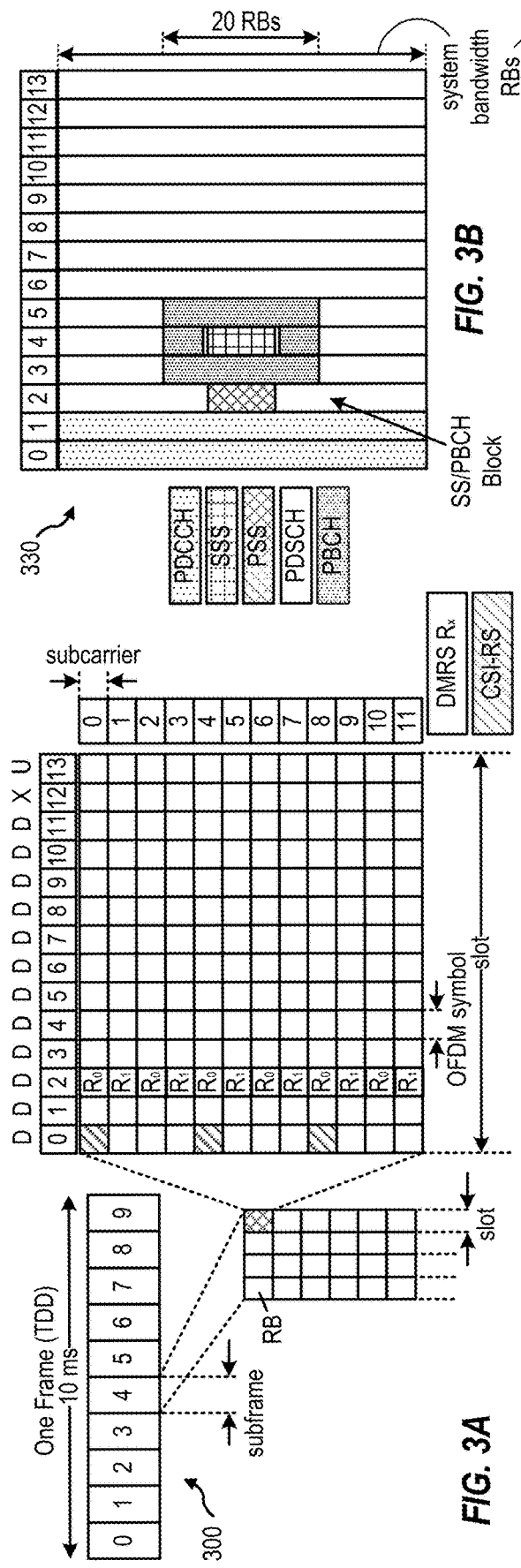
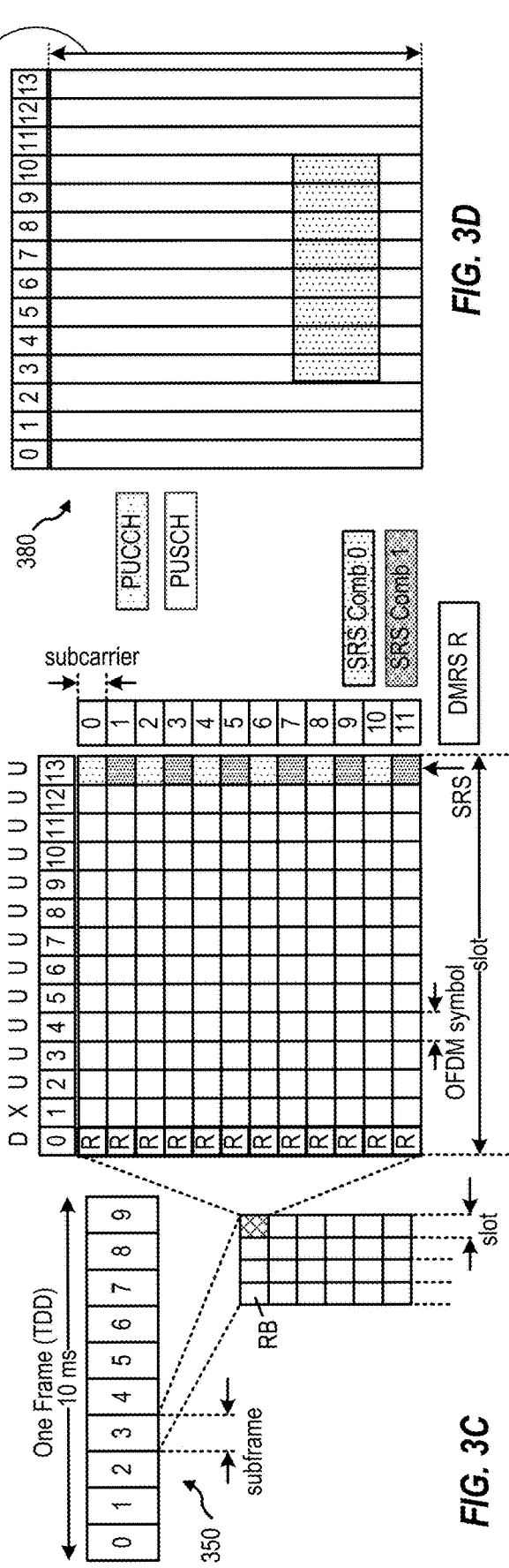
FIG. 3A
FIG. 3B
FIG. 3C
FIG. 3D

COMPENSATION FOR AN INTELLIGENT REFLECTING SURFACE

BACKGROUND

Aspects of the present disclosure relate to wireless communications, and more particularly, to techniques for wirelessly communicating with an intelligent reflecting surface.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved accuracy in communicating with an intelligent reflecting surface (IRS).

Certain aspects of the subject matter described in this disclosure can be implemented in a method for wireless communication by a first wireless node. The method generally includes obtaining an indication of a correction for an IRS to compensate for one or more characteristics of the IRS and communicating with a second wireless node via the IRS using the indication of the correction.

Certain aspects of the subject matter described in this disclosure can be implemented in an apparatus for wireless communication. The apparatus generally includes a memory and a processor coupled to the memory. The processor and the memory are configured to obtain an indication of a correction for an IRS to compensate for one or more characteristics of the IRS and communicate with a second wireless node via the IRS using the indication of the correction.

Certain aspects of the subject matter described in this disclosure can be implemented in an apparatus for wireless communication. The apparatus generally includes means for obtaining an indication of a correction for an IRS to compensate for one or more characteristics of the IRS and means for communicating with a second wireless node via the IRS using the indication of the correction.

Certain aspects of the subject matter described in this disclosure can be implemented in a computer-readable medium. The computer-readable medium has instructions stored thereon for obtaining an indication of a correction for an IRS to compensate for one or more characteristics of the IRS and communicating with a second wireless node via the IRS using the indication of the correction.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatuses, methods, processing systems, and computer-readable mediums for compensating for imperfections of an intelligent reflecting surface (IRS).

In certain cases, an IRS may have certain characteristics that can lead to the IRS reflecting signals in the wrong direction (e.g., offset from a direction to a user equipment and/or base station) and/or with the wrong radiation pattern (e.g., beamwidth or beam shape). For example, the IRS may not have a perfectly flat (smooth or even) surface, for example, due to temperature variations. The IRS may have variations in its orientation (e.g., azimuth or elevation of the IRS). When the IRS is curved (e.g., concave or convex) or conformal to an object or surface, the IRS may have variations or a change in its curvature or conformal shape, for example, due to temperature variations. Surface imperfections (such as warps, recesses, or protuberances along the surface) of an IRS can affect the phase shift of a particular reflecting (surface) element in a subarea of the IRS surface. In millimeter wave bands, surface imperfections of an IRS may be particularly harmful. A one millimeter warp along the surface of an IRS may offset the phase by a significant fraction of a phase cycle (e.g., a significant fraction of $2\pi$ radians).

Aspects of the present disclosure provide techniques and apparatus for compensating for characteristics of an IRS using an indication of a correction, such as certain correction terms. For example, the correction can be used at a controller of an IRS or other wireless communication devices, such as a base station or user equipment. When the IRS performs a beamforming function, the controller or the wireless communication device may determine phases of reflection coefficients of the surface elements based on an ideal surface assumption (or expected surface or orientation) and apply the correction. The correction may be a function of the coordinates of the surface elements and/or depend on the incident and reflected angles. The characteristic(s) may include the IRS having a curved surface, the IRS having a conformal surface, the IRS having imperfections on the surface, and/or the IRS having variations in an orientation, for example.

The techniques and apparatus for compensating for imperfections or other characteristics of an IRS described herein may enable improved wireless communication performance, such as reduced latencies and/or increased throughput, for example, due to improved accuracy of the reflected angle at the IRS. The techniques and apparatus for compensating for imperfections or other characteristics of an IRS described herein may facilitate a low cost and/or portable IRS with surface imperfections that can be mitigated with the corrections.

Introduction to Wireless Communication Networks

Figure 1:
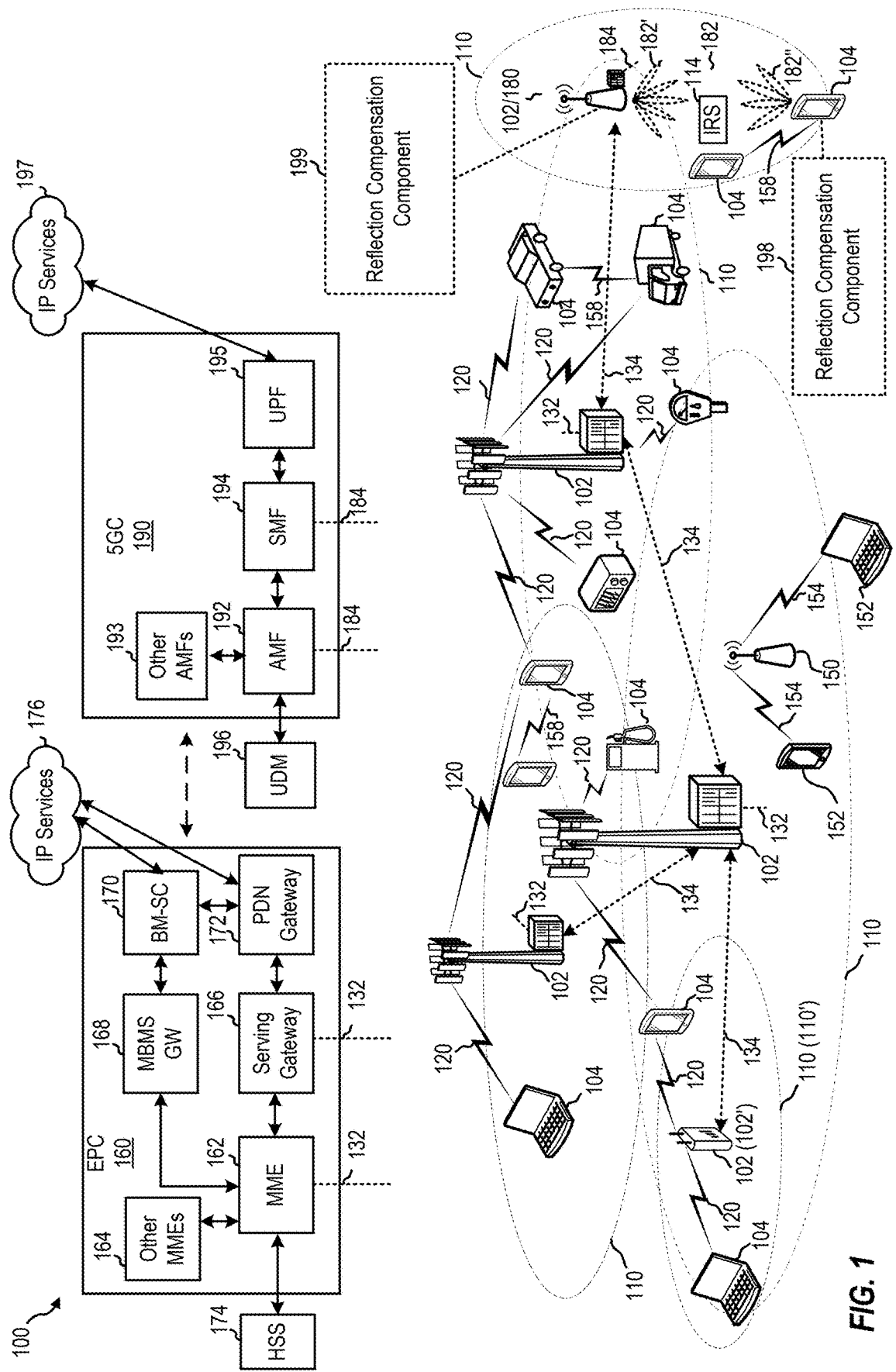
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In certain aspects, the base station 102 and user equipment 104 may communicate through an intelligent reflecting surface (IRS) 114, for example, when a line-of-sight path between the base station 102 and the user equipment 104 is obstructed by an obstacle or when the channel capacity or channel quality in the line-of-sight path is relatively low. In certain cases, multiple user equipment 104 may communicate with each other through the IRS 114. The IRS 114 may serve as a reflector for wireless communications. The IRS 114 may use a codebook for precoding one or more elements (e.g., antenna elements or meta-surface elements) thereon (referred to as reflection elements) to allow a beam from the base station 102 (e.g., a transmitter) to be re-radiated off the IRS 114 to reach the user equipment 104 (e.g., a receiver), or vice versa. A reflection controller (as further described herein with respect to FIG. 2) may control or reconfigure the spatial direction of the re-radiation (e.g., the beamforming) at the IRS 114. The term "intelligent reflecting surface" can refer to any suitable reconfigurable reflecting device in a range of reflecting devices, such as a reconfigurable intelligent surface (RIS), reflectarray, meta-surface, etc.

Wireless communication network 100 includes a reflection compensation component 199, which may be configured to obtain a correction for the IRS 114 to compensate for characteristic(s) of the IRS 114 and reflect signals between the UE 104 and BS 102 using the correction terms. Wireless network 100 further includes a reflection compensation component 198, which may be used to obtain the correction for the IRS 114.

Figure 2:
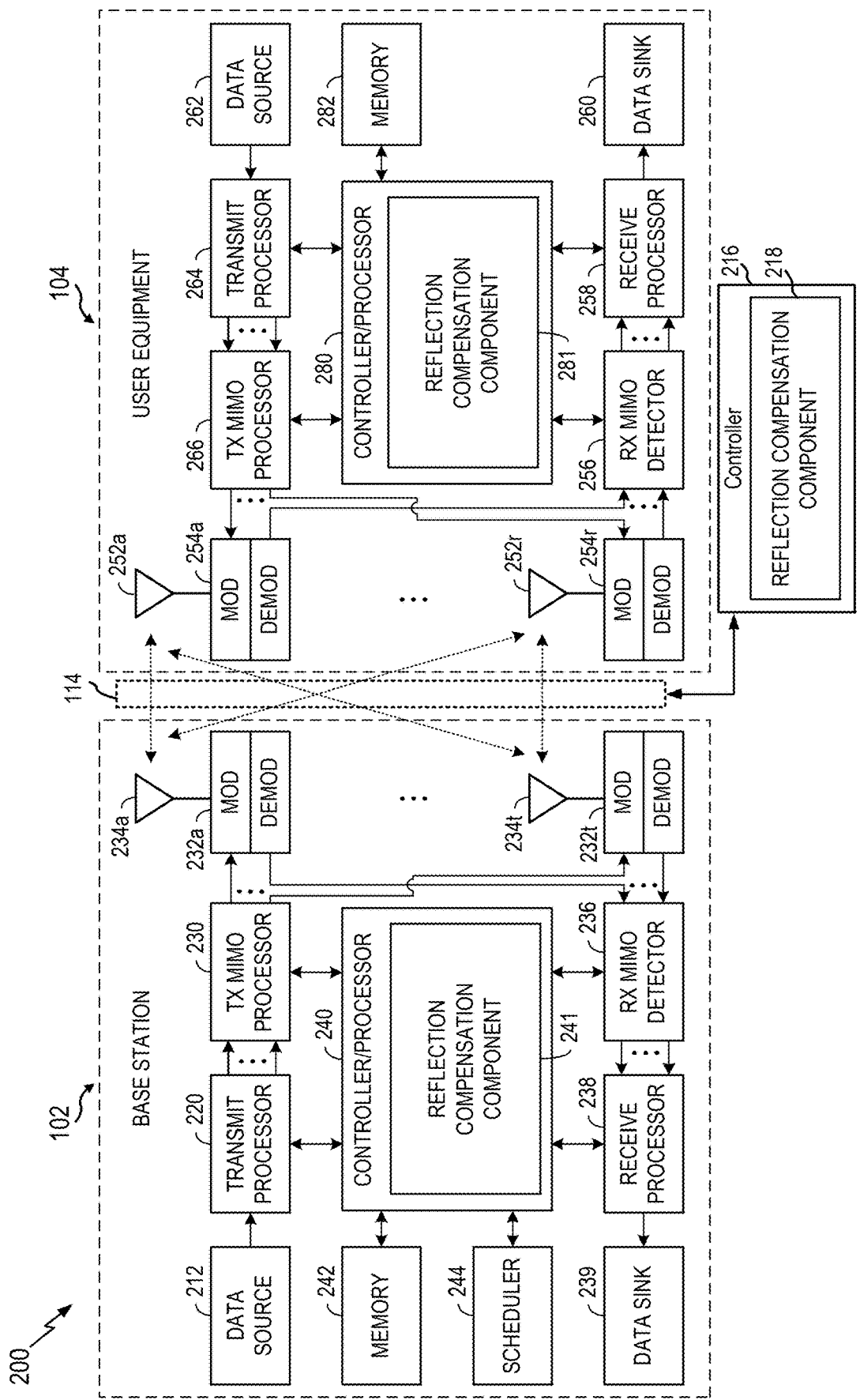
FIG. 2 is a block diagram conceptually illustrating aspects of an example of a base station and user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a reflection compensation component 241, which may be representative of the reflection compensation component 199 of FIG. 1. Notably, while depicted as an aspect of controller/processor 240, the reflection compensation component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes a reflection compensation component 281, which may be representative of the reflection compensation component 198 of FIG. 1. Notably, while depicted as an aspect of controller/processor 280, the reflection compensation component 281 may be implemented additionally or alternatively in various other aspects of user equipment 104 in other implementations.

Figure 4:
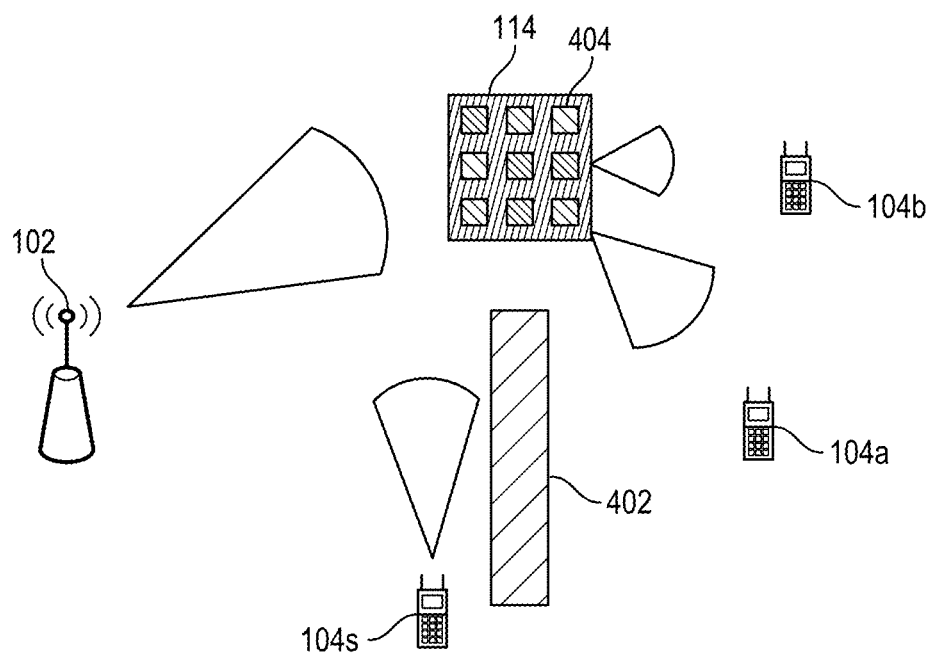
FIG. 4 illustrates an example of using an intelligent reflecting surface (IRS) in a wireless communications network.

The IRS 114 may be configured or controlled by a controller 216. Reflection elements may re-radiate radio signals between the UE and BS with certain phase shifts or amplitude changes as controlled by the controller 216. The controller 216 may reconfigure the phase or amplitude changes by applying a precoding weight to reflection elements to enable the IRS 114 to re-radiate an output beam at different directions (e.g., elevation and/or azimuth) given a particular input beam. An illustrative deployment example of the IRS 114 is shown in FIG. 4. According to the present disclosure, the controller 216 includes a reflection compensation component 218 that may determine, store, and/or apply a correction for the IRS 114 to compensate for characteristics of the IRS 114 and reflects or re-radiates signals between the UE and BS using the correction, in accordance with aspects described herein.

While the controller 216 is depicted as a separate network entity in communication with the IRS 114 to facilitate understanding, aspects of the present disclosure may be applied to the controller 216 being integrated or co-located with the IRS 114, the BS 102, and/or another UE.

While the user equipment 104 is described with respect to FIGS. 1 and 2 as communicating with a base station and/or within a network, the user equipment 104 may be configured to communicate directly with/transmit directly to another user equipment 104, or with/to another wireless device without relaying communications through a network. In some aspects, the base station 102 illustrated in FIG. 2 and described above is an example of another user equipment 104.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, wirelessly communicating with an intelligent reflecting surface may use beamforming in mmWave bands and/or other frequency bands. Introduction to Communications with an Intelligent Reflecting Surface An intelligent reflecting surface (IRS) may be deployed to reflect electromagnetic waves in specified directions based on electrical control applied across the IRS. An IRS may be considered a surface that includes densely packed, very small surface elements (e.g., reflecting elements). Each surface element has a controllable reflection coefficient, by which the phase-shift between the incident and reflected rays to/from the surface element can be controlled.

By properly setting the surface phase (e.g., the phases of reflection coefficients of certain surface elements), a downlink beam from a base station (BS) can be reflected from the IRS towards a user equipment (UE) or vice versa in the uplink. An IRS may help reduce path loss and/or avoid blockages in the line-of-sight propagation as further described herein.

An IRS can provide directional control of the reflected wave/beam and introduce lower losses due to reflection compared to other reflectors (e.g., a wall or passive repeater). In some cases, an IRS may operate without substantial power consumption when the IRS operates passively to reflect or refract beams from a transmitter toward a receiver. In some cases, the reflection or refraction direction of an IRS may be controlled by a controller, such as a base station, network controller, or a UE (e.g., a sidelink monitoring UE). An IRS may be implemented in sidelink communications, e.g., vehicle-to-everything and/or device-to-device (D2D) communications.

An IRS can alter the nature of the communication environment. An IRS may enable the reflection of transmission around a blockage, especially in mmWave bands, for example, as described herein with respect to FIG. 4. In certain cases, the direct path may be weak due to blockage, where the path through the IRS is dominant (as reflection losses may be minimal). An IRS may enable signal enhancement through additional signal paths (e.g., a line of sight path from a transmitter and an indirect path from an IRS) to a UE. For example, the IRS may adjust the reflected wave to constructively enhance with a line of sight signal at the receiver.

FIG. 4 illustrates an example of using an IRS (such as the IRS 114 of FIGS. 1 and 2) to overcome blockage 402 in a wireless communications network. As shown, an IRS 114 may be arranged to reflect or otherwise re-radiate the radio signals from the BS 102 to bypass the blockage 402. For example, the two-way communications between the BS 102 and the UE 104*a* may be enabled by the IRS 114 re-radiating one or more beams from the BS 102 toward the UE 104*a*, or vice versa. Furthermore, the IRS 114 can also be configured (e.g., directing incoming and outgoing beams at different angles) to enable the UEs 104*s* and 104*a* to communicate via sidelink channels, for example, around the blockage 402.

The IRS 114 may perform passive beamforming. For example, the IRS 114 may receive signal power from the transmitter (e.g., the BS 102, UE 104*a*, or UE 104*s*) proportional to a number of reflecting elements 404 thereon. In certain cases, the reflecting elements can be referred to as surface elements or meta-atoms. When the IRS reflects or refracts the radio signal, the reflecting elements 404 cause phase shifts to perform conventional beamforming or precoding. The phase shifts may be controlled by precoding weights (e.g., a multiplier or an offset of time delay) applied to the reflecting elements. For an array of reflecting elements, such as an m x n rectangular matrix, for example, a respective precoding weight may be generated or specified for each of the reflecting elements by a controller. In certain aspects, the IRS 114 may be implemented as a reflectarray with a passive antenna array, such that the reflecting element 404 may be implemented as an antenna coupled to a phase shifter. In certain aspects, the IRS 114 may be implemented with metasurfaces, such that the reflecting element 404 may be implemented as a reconfigurable metasurface that can impose an amplitude and/or phase profile on an incident RF signal. The reflecting elements can be controlled to reflect an incident electromagnetic wave in a desired direction (e.g., azimuth and/or elevation) and/or with a desired beamwidth. Aspects Related to Compensation for an Intelligent Reflecting Surface Aspects of the present disclosure provide techniques and apparatus for compensating for characteristics of an IRS using an indication of a correction, such as correction information or certain correction terms. For example, the correction can be used at a controller of an IRS or other wireless communication devices, such as a base station or user equipment. When the IRS performs a beamforming function, the controller or the wireless communication device may determine the surface phase based on an ideal surface assumption and apply the correction. The correction may be a function of the coordinates of the surface elements and/or depend on the incident and reflected angles.

The techniques and apparatus for compensating for characteristics of an IRS described herein may enable improved wireless communication performance, such as reduced latencies and/or increased throughput, for example, due to improved accuracy of the reflected angle at the IRS. The techniques and apparatus for compensating for characteristics of an IRS described herein may facilitate low cost and/or portable IRSs with surface imperfections that can be mitigated with the correction.

Figure 5:
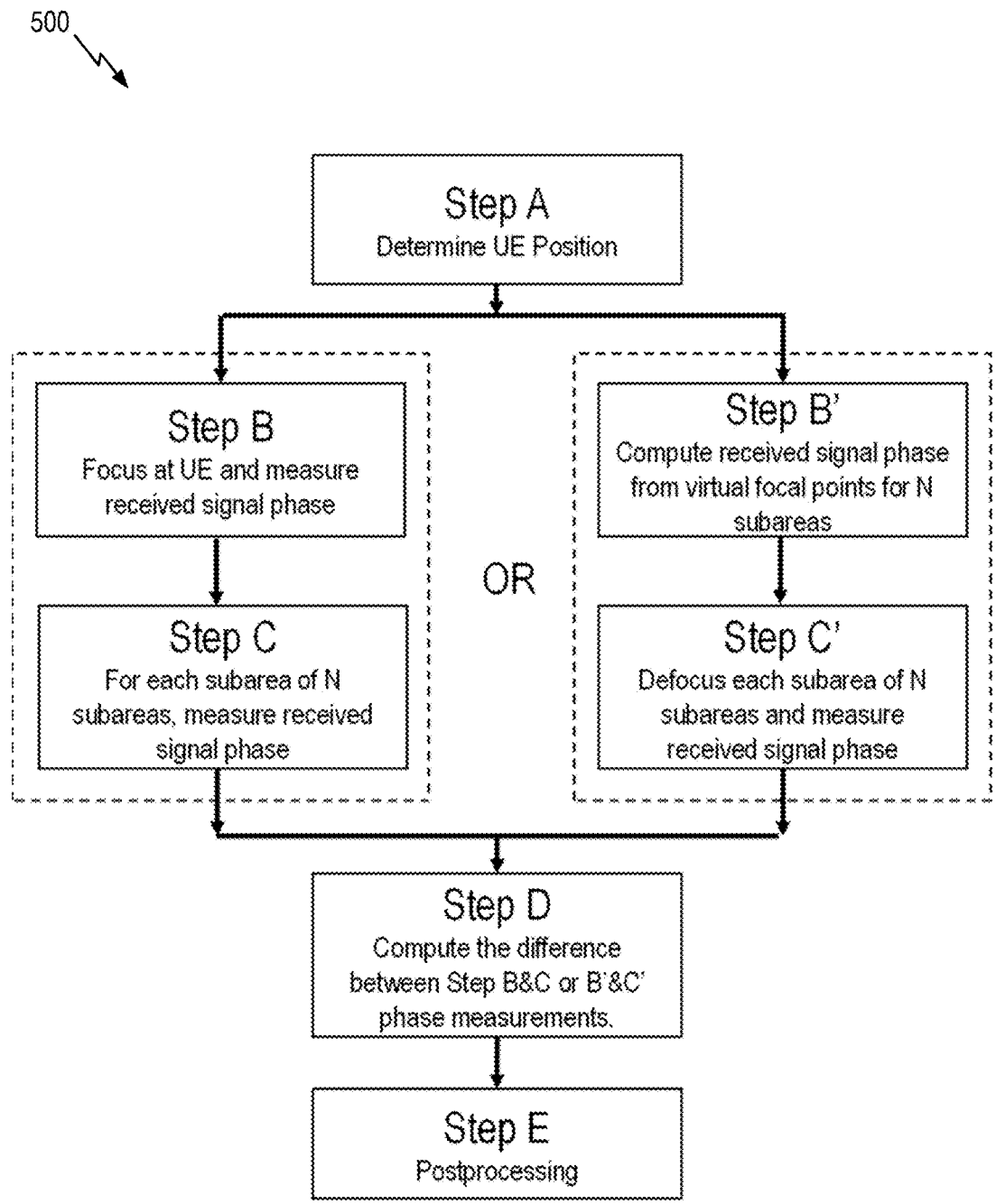
FIG. 5 is a flow diagram illustrating example operations for determining a correction that can compensate for characteristics of an IRS, in accordance with certain aspects of the present disclosure.

FIG. 5 is a flow diagram illustrating example operations 500 for determining a correction that can compensate for characteristics (e.g., a curved surface, a conformal surface, surface imperfections, and/or variations in an orientation) of an IRS, in accordance with certain aspects of the present disclosure. The characteristic(s) may include the IRS having a variation of a surface (e.g., a variation in or a change to an expected curvature or conformal shape of the surface), the IRS having an imperfection on the surface (e.g., warps, recesses, or protuberances along the surface), and/or the IRS having a variation in an orientation (e.g., azimuth and/or elevation), for example. The operations 500 are described herein with respect to the wireless communications network 600 depicted in FIG. 6. Referring to FIG. 5, the BS 102 may know certain properties associated with the IRS 114, such as the position of the IRS 114, the orientation of the IRS 114, the size of the IRS 114, the arrangement of surface elements at the IRS 114, etc. The BS 102 may send control signals to the IRS 114, such as signaling indicating focusing/defocusing commands, (virtual) focal point locations, etc.

Optionally, at Step A, the BS 102 may determine the position of the UE 104. The position of the UE 104 can be determined using any suitable positioning technique, such as via a global navigation satellite system (GNSS) or angle-of-arrival estimations (or angle-of-departures from the IRS towards the UE 104) as further described herein with respect to FIG. 10.

Figure 8A:
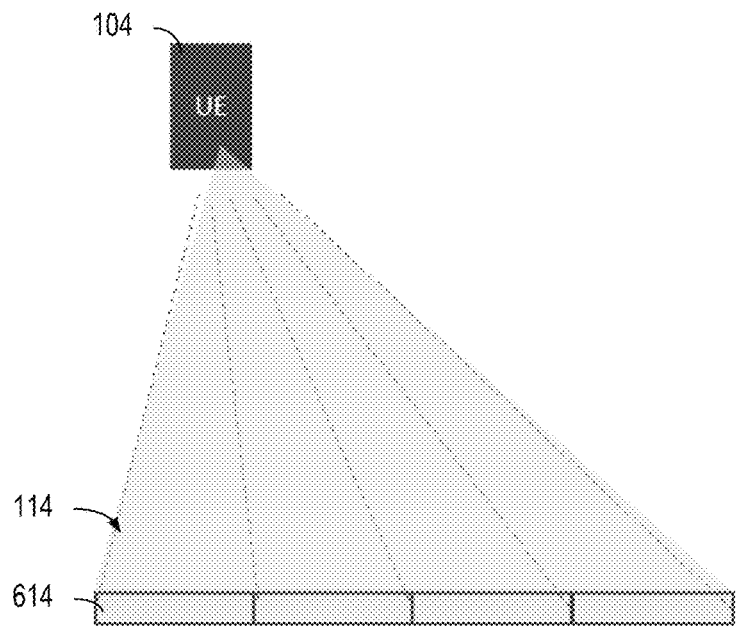
FIG. 8A is a side view of an example IRS focusing reflection patterns to a UE, in accordance with certain aspects of the present disclosure.

At Step B, the BS 102 may instruct the IRS 114 to focus reflections of signals in the direction of the UE 104 using the determined position of the UE 104, for example, as depicted in FIG. 8A. The BS 102 may transmit certain reference signals, such as a synchronization signal block (SSB) or a channel state information reference signal (CSI-RS), and the IRS 114 may focus the reflections of the reference signal towards the UE 104. The UE 104 may measure the phase of the reflected signals received via the reflection link 612, and the UE 104 may report the measured phase to the BS 102 and/or controller 216. The measured phase may be indicative of an ideal or expected phase, which may be used to determine the correction, such as correction terms, as further described herein.

At Step C, the IRS 114 may be segmented into N subareas 614, where a subarea may include one or more reflecting elements. As an example, the IRS 114 may be divided into 16 subareas arranged in 4 by 4 rectangular or square array. For each of the subareas 614, the UE 104 may measure the phase of a reflected signal received on the reflection link 612. For example, the controller 216 may activate one subarea 614 at a time to reflect the signal from the BS 102, such that the UE 104 measures the phase for each of the subareas in the respective reflection occasion for a particular subarea. When a subarea is activated, the surface phase over that subarea may be set to focus at the UE 104 as in Step B. Additionally or alternatively, the controller 216 may activate all or a subset of the subareas 614 to reflect the signal, where a separate orthogonal cover in each reflection occasion is used at the IRS 114 as further described herein with respect to FIG. 9.

Figure 8B:
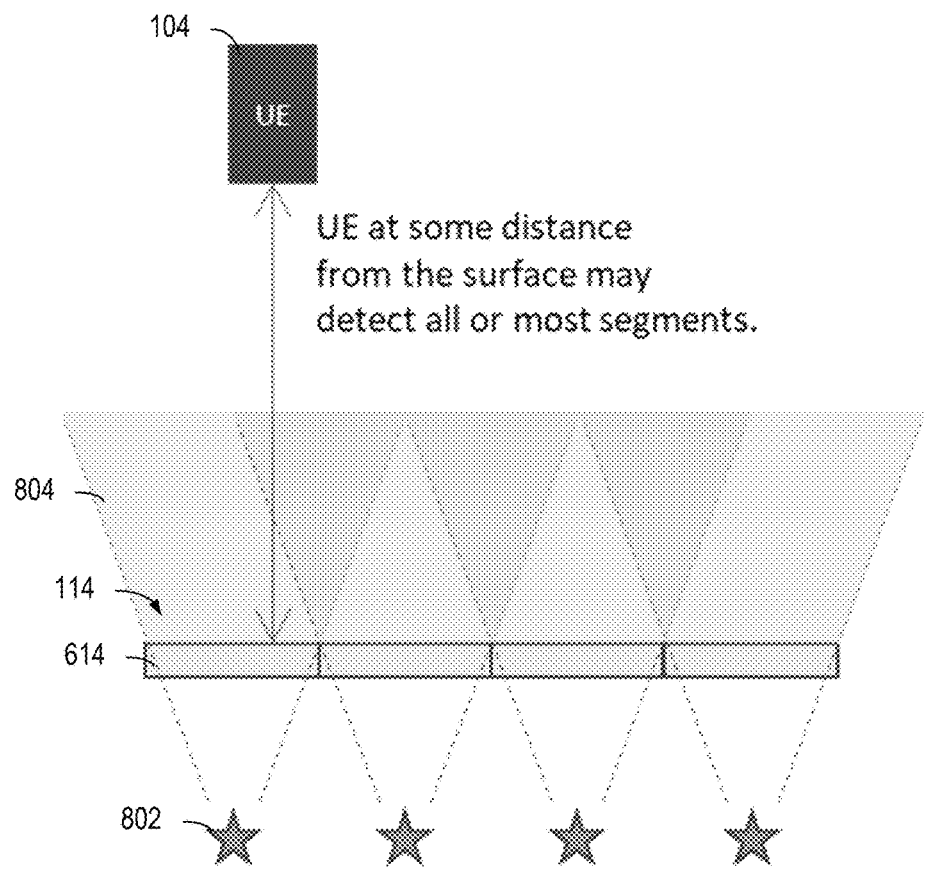
FIG. 8B is a side view of an example IRS defocusing reflection patterns to a UE, in accordance with certain aspects of the present disclosure.

Additionally or alternatively, at Step B', the BS 102 may compute the expected/ideal phases for each subarea 614 of the IRS 114 using a model of beam radiation patterns from an IRS. For example, the model may represent the radiation patterns from an IRS with a perfectly flat surface free of defects or imperfections (e.g., warps, recesses, or protuberances along the surface). In some cases, the model may represent the radiation patterns from an IRS with a curved or conformal surface and/or with an expected orientation (e.g., azimuth or elevation). An ideal phase may refer to a phase expected from an IRS, where the IRS has an expected surface (e.g., flat, curved, or conformal) and/or an expected orientation (e.g., azimuth or elevation). For example, the surface of the IRS may be expected to be without imperfections, such as an IRS with a perfectly flat surface. In some cases, the surface of the IRS may be expected to have a particular curvature, such as parabolic curvature, concave, or convex. A defocusing model may be used to determine the expected or ideal phases for each subarea 614. As shown in FIG. 8B, virtual focal points 802 may be assigned to each of the N subareas 614 to provide a defocused radiation pattern 804. The expected phase from each subarea 614 may be computed, for example, using the following expression:

$$\phi_i = \frac{2\pi |VFP_i - UE_{pos}|}{\lambda} \quad (1)$$

where $\phi_i$ is the calculated phase for a particular subarea; $VFP_i$ represents the position of virtual focal point for subarea i; $UE_{pos}$ is the position of the UE 104, for example, obtained at Step A; and $\lambda$ is the nominal wavelength used for the signal (e.g., SSB or CSI-RS) transmissions at the BS 104. The absolute value operation (e.g., |x|) in Expression (1) may provide the length of a vector x.

At Step C', the IRS 114 may reflect the signals from the BS 102 using defocusing, such as the virtual focal points assigned to each of the N subareas 614. The controller 216 may set the surface phase of each subarea 614 for defocusing. The wide defocused beams may provide enough coverage for multiple UEs simultaneously. The UE 104 may measure phases of the reflected signals for each of the N subareas 614. The UE 104 may report the measured phase to the BS 102 and/or controller 216. Each of the subareas 614 may be activated for reflections one at a time. Additionally or alternatively, multiple subareas can be activated at a time using the orthogonal cover as described in FIG. 9.

At Step D, the difference of the ideal/expected phase(s) (e.g., obtained at Step B and/or Step B') and the measured phases (e.g., obtained at Step C and/or Step C') may be determined. The phase deviations from the ideal phase(s) may be indicative of the phase shift due to surface imperfections (or an unexpected curvature and/or an unexpected orientation) at the IRS 114, for example. In the focused reflection case, the ideal phase may be determined by measuring a single phase of the signals focused on the UE 104 through the IRS. The phase of the signals measured at Step B may serve as the ideal phase for each subarea of the IRS. Phase errors may be computed by comparing the ideal phase to the received measured phase from each individual subarea at Step C and/or Step C'. The surface phase correction for each subarea of the IRS may be computed based on the difference of the ideal received phase (e.g., obtained at Step B and/or Step B') and the respective received phases.

At Step E, the raw error obtained in Step D can be post-processed to determine the correction, such as correction term(s) for the IRS. For example, the average phase error may subtracted from each of the phase errors for the subareas. The remaining zero-mean variation may represent the correction terms that can used to compensate for the characteristic(s) of the IRS (e.g., surface imperfections). Other systematic errors (e.g., position and/or orientation errors associated with the IRS) may be removed, accounted for, or considered in determining the correction term(s). In certain aspects, the correction terms may be determined using an interpolation over certain subareas 614 for smoothing or filtering. Multiple correction terms (e.g., phase errors) can be estimated based on various UE locations, angles of arrival, reflection beam pattern, subarea usage, etc. At an IRS, the correction terms may serve as additional phase shifts applied to the reflection elements to form the reflection (beam) pattern, direction (e.g., elevation and/or azimuth), and/or radial distance target (virtual) focal point.

In certain aspects, the operations 500 may be repeated to determine the correction for different UE locations and/or beam pattern/directions for the IRS. The operations 500 may be performed over the lifespan of the IRS as the surface and/or orientation of the IRS changes over time, for example, due to thermal stresses (e.g., thermal runaway), electrical stresses (e.g., overvoltages or electrostatic discharges), mechanical stresses, electromigration, etc.

Figure 6:
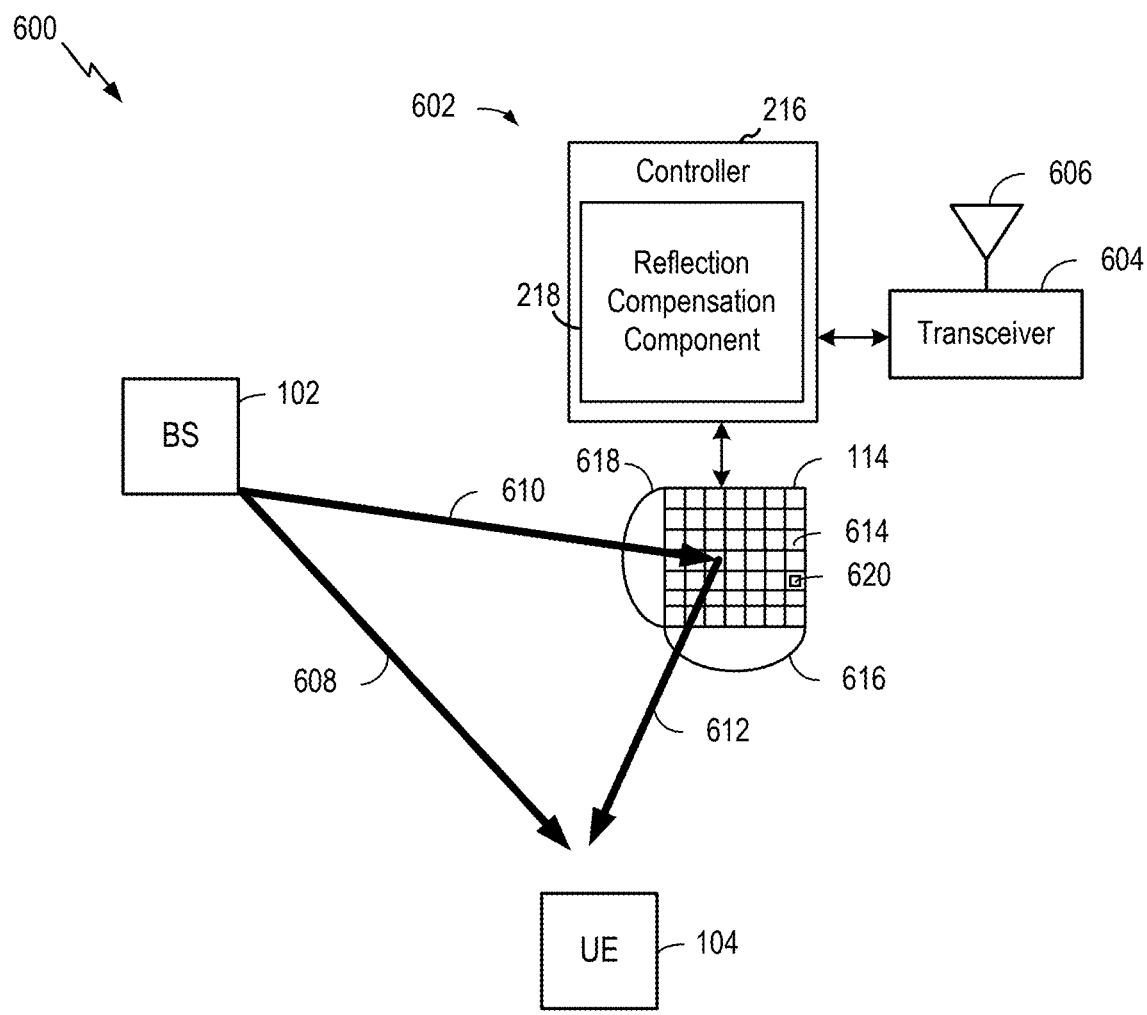
FIG. 6 is a diagram illustrating an example wireless communications network with an IRS, in accordance with certain aspects of the present disclosure.

FIG. 6 is a diagram illustrating an example wireless communications network 600 with an IRS 114, in accordance with certain aspects of the present disclosure. As shown, a network entity 602 may include the IRS 114, the controller 216, and a transceiver 604. In certain aspects, the network entity 602 may control a plurality of IRSs 114. The controller 216 may be coupled to the transceiver 604, which may be configured to transmit (or send) and receive signals for the network entity 602 via an antenna 606, such as the various signals described herein. The network entity 602 may receive control signaling from the BS 102 via the transceiver 604. For example, the network entity 102 may provide certain commands to configure the radiation pattern of the reflections (e.g., focused or defocused beams as further described herein with respect to FIGS. 8A and 8B) at the IRS 114. The network entity may provide the correction (e.g., correction term(s)) that enable the controller to compensate for the characteristics of the IRS 114. In certain cases, the UE 104 may receive signals from the BS 102, for example, via the direct link 608. The IRS 114 may receive signals from the BS 102 on the indirect link 610 and reflect or refract the signals, for example, on the reflection link 612 towards the UE 104. The controller 216 may adjust the beamwidth, direction (e.g., azimuth and/or elevation), and/or radial distance of the (virtual) focal point of the reflections from the IRS 114. For example, the controller 216 may adjust the phase shifts applied at subareas 614 of the IRS 114 for co-phasing/beamforming. Each of the subareas 614 may include one or more reflecting elements, such as the reflecting element 404.

The IRS 114 may have certain characteristic(s) that can lead to the IRS 114 reflecting signals with the wrong radiation pattern and/or in the wrong direction, for example, offset from the direction to the UE 104 and/or the BS 102. The IRS 114 may have variations in its orientation, such as a variation of an azimuth 616 or a variation of an elevation 618. In some cases, the IRS 114 may have an unexpected surface characteristic 620, such as a surface imperfection (e.g., warps, recesses, or protuberances along the surface) and/or a variation in a surface curvature or conformal surface.

In certain aspects, the correction may be obtained during UE positioning. For example, determination of the correction at Steps B' and C' can be integrated into Step A using angle-of-arrival estimations or angle-of-departures from the IRS as described herein with respect to FIGS. 5 and 10. For example, angle-of-arrivals for an ideally flat surface (or expected curvature, expected surface, or expected orientation) may be determined between the IRS and the UE for each of the N subareas. The lines drawn along the angle-of-arrivals may intersect at the UE. For a surface with imperfections, there will be deviations in the angle-of-arrivals. The deviations on the angle-of-arrivals can be measured for each subarea in the form of rotation matrices (alternatively, in the form of a rotation axis and angle per subarea), which can change the measured angle to the angle for the actual UE position. The rotation matrix for a subarea of the IRS may rotate or adjust the angle-of-arrival and/or angle-of-departure in the direction of the actual UE position. That rotation matrix may provide an angular adjustment of a direction (e.g., a vector) relative to a coordinate system, such as rotating a direction along a plane clockwise (or counterclockwise) through a certain angle. The rotation matrices can be applied as a correction for a direction (e.g., azimuth and/or elevation) of a beam pattern from each subarea, for example, as an adjustment of the direction of the beam pattern of the IRS. The rotation matrices can be filtered over the subareas as well as over time for smoothing. The filtering/interpolation of rotation matrices may be in the form of filtering rotation axes and angles across subareas such that the interpolated rotation axis and angle varies slowly over the surface of the IRS.

Figure 7:
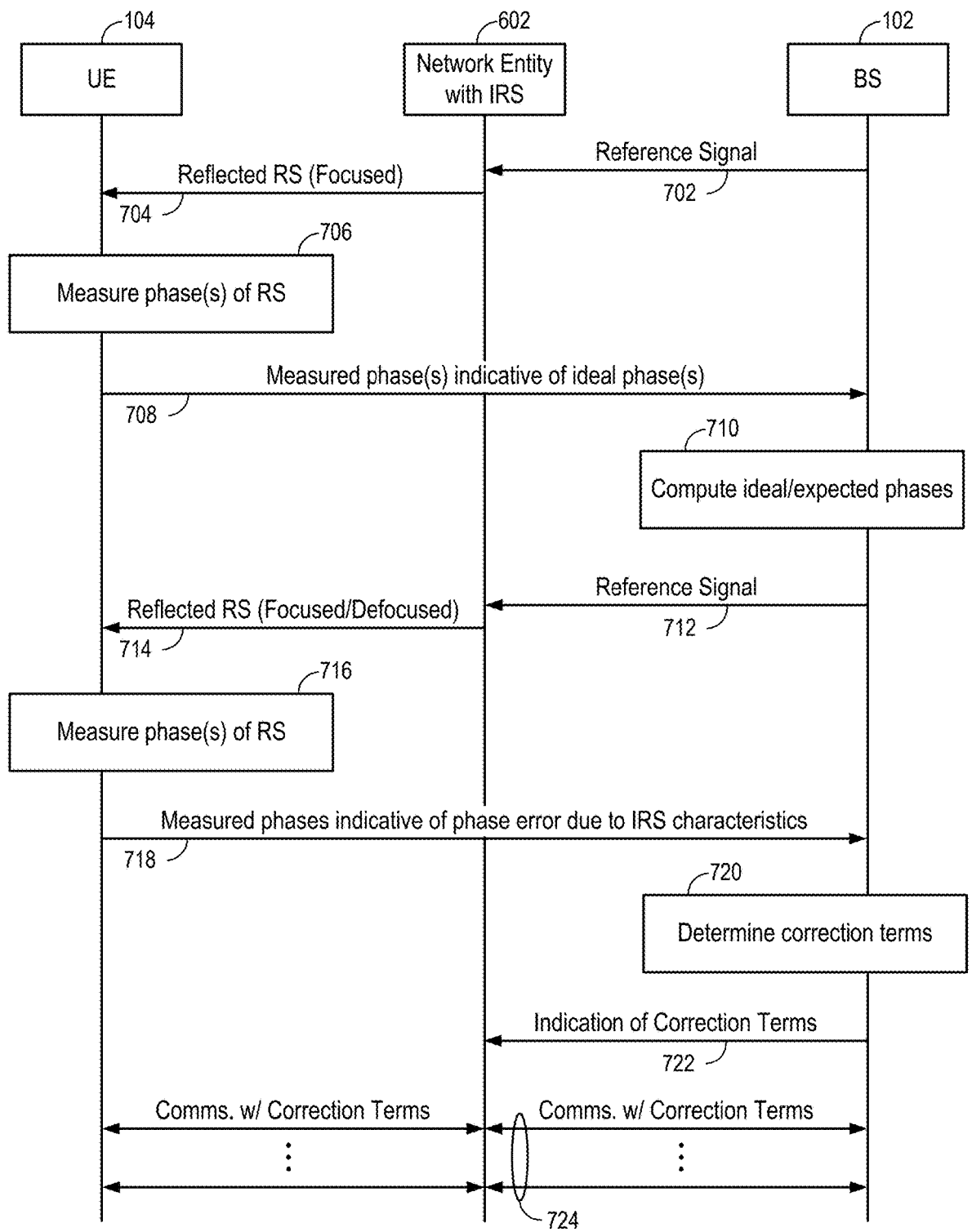
FIG. 7 is a signaling flow illustrating example signaling for determining a correction for an IRS and communicating with the correction, in accordance with certain aspects of the present disclosure.

FIG. 7 is a signaling flow illustrating example signaling for determining correction for an IRS and communicating with the correction, in accordance with certain aspects of the present disclosure. At activity 702, the BS 102 may transmit a reference signal (e.g., an SSB and/or CSI-RS) to the IRS of the network entity 602. For example, the BS 102 may periodically transmit reference signals using different beam directions, where at least one of the reference signals is transmitted to the IRS, for example, as depicted in FIG. 6. At activity 704, the IRS of the network entity 602 may reflect or re-radiate the reference signal to the UE 104. As an example, the IRS may focus the reflections to the UE 104, as described herein, with respect to FIG. 8A. At activity 706, the UE 104 may measure the phase(s) of the reference signal received from the IRS. At activity 708, the UE 104 may transmit an indication of the measured phase(s) to the BS 102, where the measured phase(s) may be indicative of an ideal/expected phase for the IRS. Additionally, or alternatively, at activity 710, the BS 102 may compute the ideal/expected phases, for example, using a defocused reflection pattern model for each of the N subareas of the reflecting reconfigurable device. Activities 702-710 may be representative of Step B and/or Step B' as depicted in FIG. 5.

At activity 712, the BS 102 may transmit a reference signal to the IRS of the network entity 602. At activity 714, the IRS may reflect re-radiate the reference signal to the UE 104. The IRS may reflect the reference signal using each subarea at a time and/or using an orthogonal cover, as described herein with respect to FIG. 9. In certain cases, the IRS may reflect the reference signal using a focused or defocused radiation pattern (e.g., a reflection pattern or beam pattern at the IRS), for example, as depicted in FIG. 8A or FIG. 8B. At activity 716, the UE 104 may measure the phases of the received reference signal for each of the subareas of the IRS, where a difference of the measured phases and the ideal phases may be indicative of the characteristics of the IRS, such as surface imperfections, variations in a curvature or conformal shape, or a variation in the orientation of the IRS. At activity 718, the UE 104 may transmit an indication of the measured phases of the received reference signal for each of the subareas to the BS 102. Activities 712-718 may be representative of Step C and/or C' as depicted in FIG. 5.

At activity 720, the BS 102 may determine a correction for the IRS using the expected/ideal phase(s) as measured or computed at activity 708 and/or activity 710 and the measured phases obtained at activity 718, for example, as described herein with respect to FIG. 5. The correction may compensate for characteristic(s) (e.g., surface imperfections) associated with the IRS. Activity 720 may be representative of Steps D and E as depicted in FIG. 5.

At activity 722, the BS 102 may transmit an indication of the correction to the network entity 602, which may control the IRS to orient reflections to the UE 104 and/or the BS 102 based on the correction. The BS 102 may provide the network entity 602 with the correction to orient reflections to the UE 104 and/or the BS 102 with improved accuracy.

At activity 724, the BS 102 may communicate with the UE 104 via the IRS using the correction. As an example, the BS 102 may transmit a data signal to the UE 104, and the IRS may focus reflections to the UE 104 using the correction. The IRS may adjust phase shifts used to beamform the reflection pattern based on the correction terms. The correction may enable improved wireless communication performance between the UE 104 and BS 102, such as reduced latencies, increased throughput, and/or increased signal quality.

FIG. 8A is a side view of an example IRS focusing reflection patterns to a UE, in accordance with certain aspects of the present disclosure. As shown, each of the subareas 614 of an IRS 114 may focus a reflection (re-radiation) pattern on the UE 104.

FIG. 8B is a side view of an example IRS defocusing reflection patterns to a UE, in accordance with certain aspects of the present disclosure. As shown, each of the subareas 614 of the IRS 114 may defocus a reflection (re-radiation) pattern 804 based on certain positions for virtual focal points 802. In this example, the virtual focal points 802 may be located behind the center of each of the subareas by a certain distance. A defocused reflection (re-radiation) pattern of an IRS may have a virtual focal point located behind the IRS, such as behind a subarea of the IRS. Defocusing a reflection (re-radiation) pattern may include arranging a focal point behind the IRS, such as behind a subarea of the IRS. A focal point may represent a point where the reflection (re-radiation) pattern of an IRS (or subarea thereof) appears to converge or diverge. A virtual focal point may represent a convergence point of a reflection pattern that appears to be positioned behind the IRS, for example, opposite to the radiation side as depicted in FIG. 8B.

Figure 9:
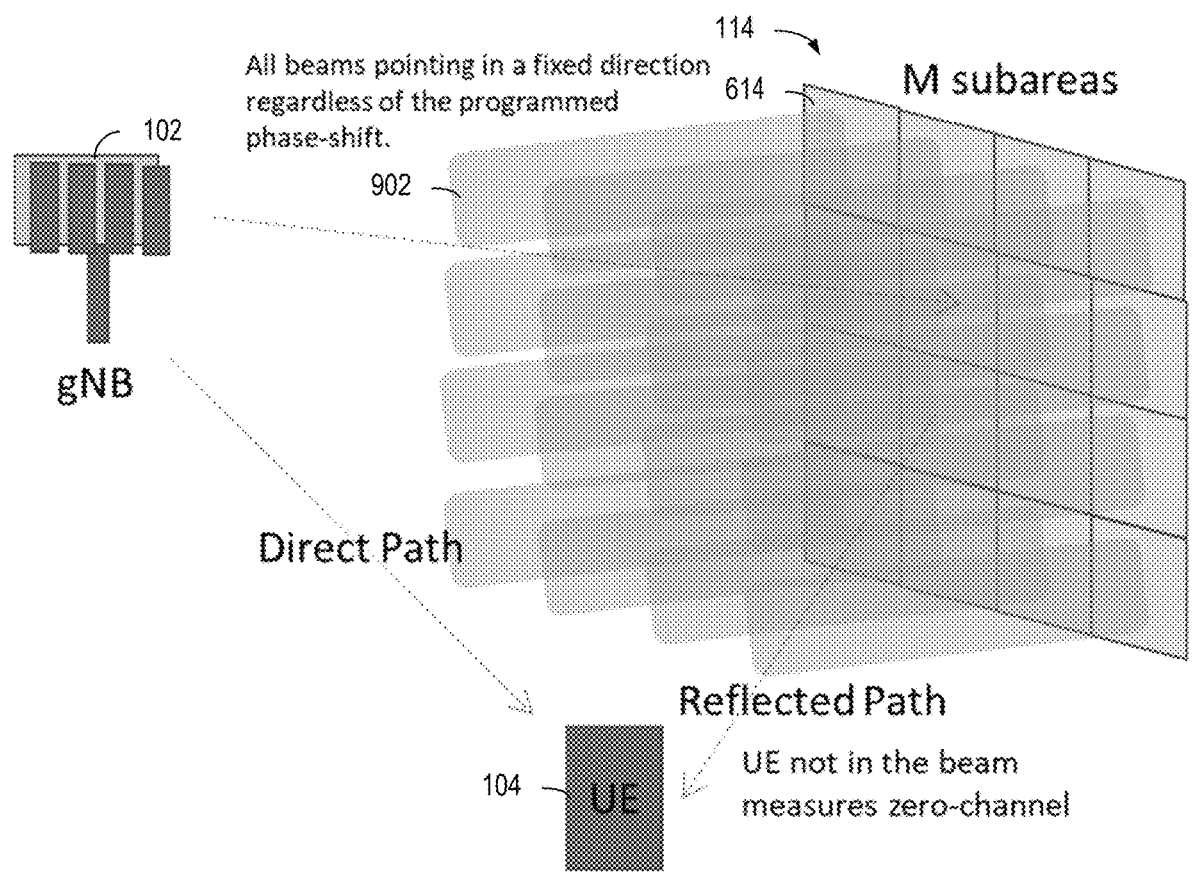
FIG. 9 is a diagram illustrating an example of an orthogonal cover from an IRS, in accordance with certain aspects of the present disclosure.

FIG. 9 is a diagram illustrating an example of an orthogonal cover from an IRS, in accordance with certain aspects of the present disclosure. As shown, the IRS 114 may reflect (or re-radiate) reflection patterns 902 from the M subareas 614 using an orthogonal cover. There may be a direct path between the BS 102 and UE 104. The IRS 114 may reflect the signal using all subareas over M+1 occasions (symbols) with a phase shift per subarea and occasion (symbol). Furthermore, the phase shift may be added on top of the surface phase used to focus or defocus each subarea as shown in FIGS. 8A and 8B. For example, the IRS 114 may orient the reflection patterns 902 using the focused or defocused radiations patterns, for example, as shown in FIGS. 8A and 8B, respectively. In certain cases, the IRS 114 may orient the reflection patterns 902 in the same direction with the same beam width pattern, for example, at a certain azimuth and elevation where the beams are oriented substantially orthogonal to the surface of the IRS 114. The BS 102 may transmit a reference signal for M+1 symbols, where in symbol$_i$, the phase of the path$_j$ for a given subarea 614 is set based on the (j, i) element of an orthonormal (orthogonal) matrix (such as a Hadamard or a discrete Fourier transform matrix). In certain aspects, the phase of the path$_j$ may be added to the phase shift used for focusing or defocusing the radiation pattern to ensure the UE is in the radiation pattern of the reflections. For example, if the UE measures a zero-channel, the orthogonal cover phase shifts may be added on top of a surface phase for focusing or defocusing the radiation pattern toward the UE 104. The direct path from the BS 102 to the UE 104 may correspond to a phase of zero. M+1 channel coefficients can be solved for each of the subareas. Although the number of symbols (or reflection occasions) used in the orthogonal cover operations may be the same as in the case of activating one subarea at a time, the orthogonal cover operation allows activation of the whole surface of the IRS rather than a subarea, which may provide a stronger signal at the UE.

Figure 10:
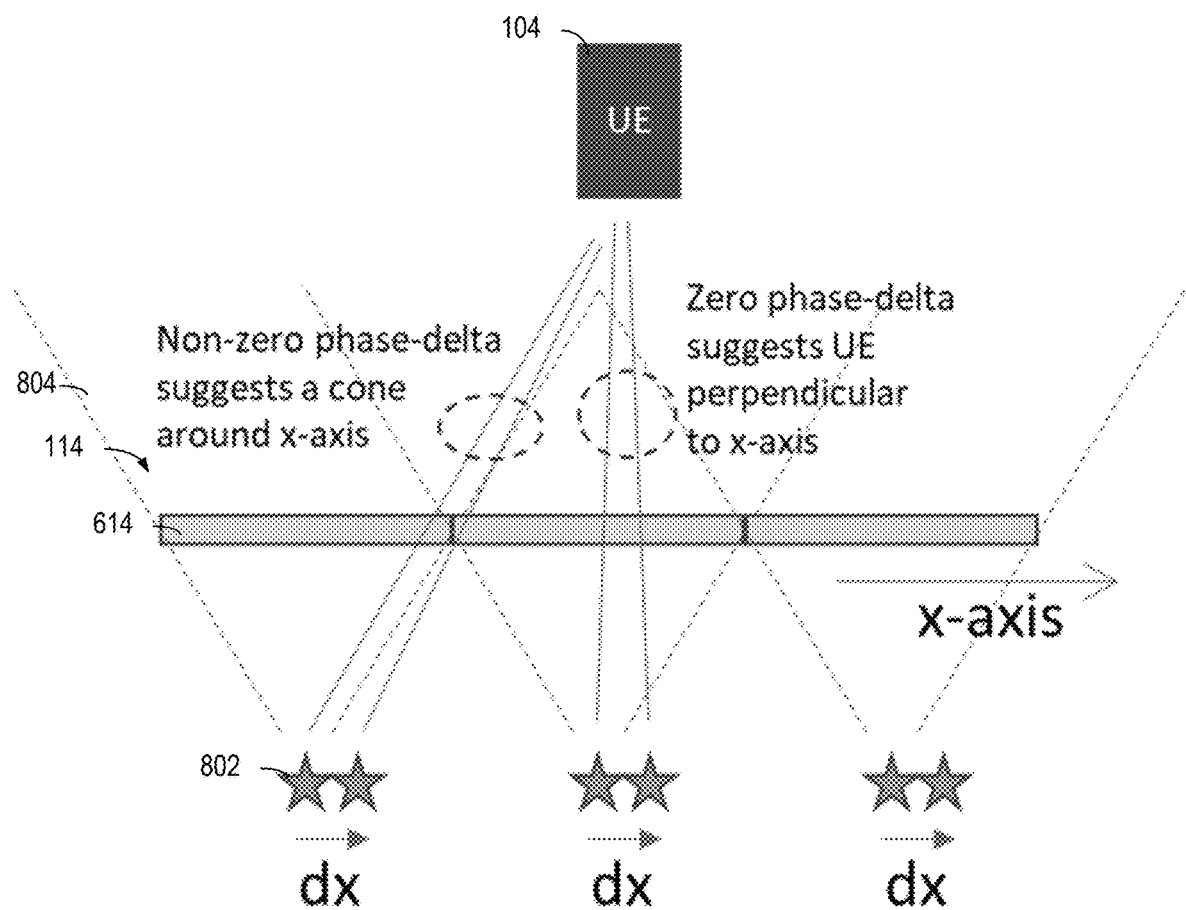
FIG. 10 is a side view illustrating an example of UE positioning using angles of departure from IRS subareas towards a UE, in accordance with certain aspects of the present disclosure.

FIG. 10 is a side view illustrating an example of UE positioning using angle-of-arrivals at a UE (or angle-of-departures at an IRS), in accordance with certain aspects of the present disclosure. The position of the UE may be estimated with respect to the IRS to fulfil Step A of FIG. 5, for example. Using the UE position and the virtual focal point 802 positions, the expected/ideal phases (up to an overall phase ambiguity that is constant for the whole surface) may be computed, for example, as described herein with respect to Step B' as depicted in FIG. 5. The UE position may be determined based on angle-of-arrival estimation using certain measurements. Each of the virtual focal points 802 may be located behind a central position (e.g., a centroid) of the corresponding subarea by a specified distance. Each of the virtual focal points 802 may be moved in a first direction (dx) with respect to the first point. Each of the virtual focal points 802 may be moved in a second direction (dy) with respect to the first point, where the x-axis and y-axis are parallel to the IRS and linearly independent directions. The UE may measure phase differences (which may have zero integer ambiguity due to small dx and dy movements) when the virtual focal points 802 are moved in the different directions. The phase differences may be converted to angle-of-arrivals (AoAs) by geometric calculations, and the UE position may be derived using the estimated AoAs for different subareas. After initial positioning using the defocused reflections, a refined positioning can optionally be performed using focused reflections at the estimated UE position and performing phase measurements at the UE. It will be appreciated that the example focal point movements along the x-axis as depicted FIG. 10 may be similarly performed along the y-axis or other directions (such as a z-axis) as described herein.

Figure 11:
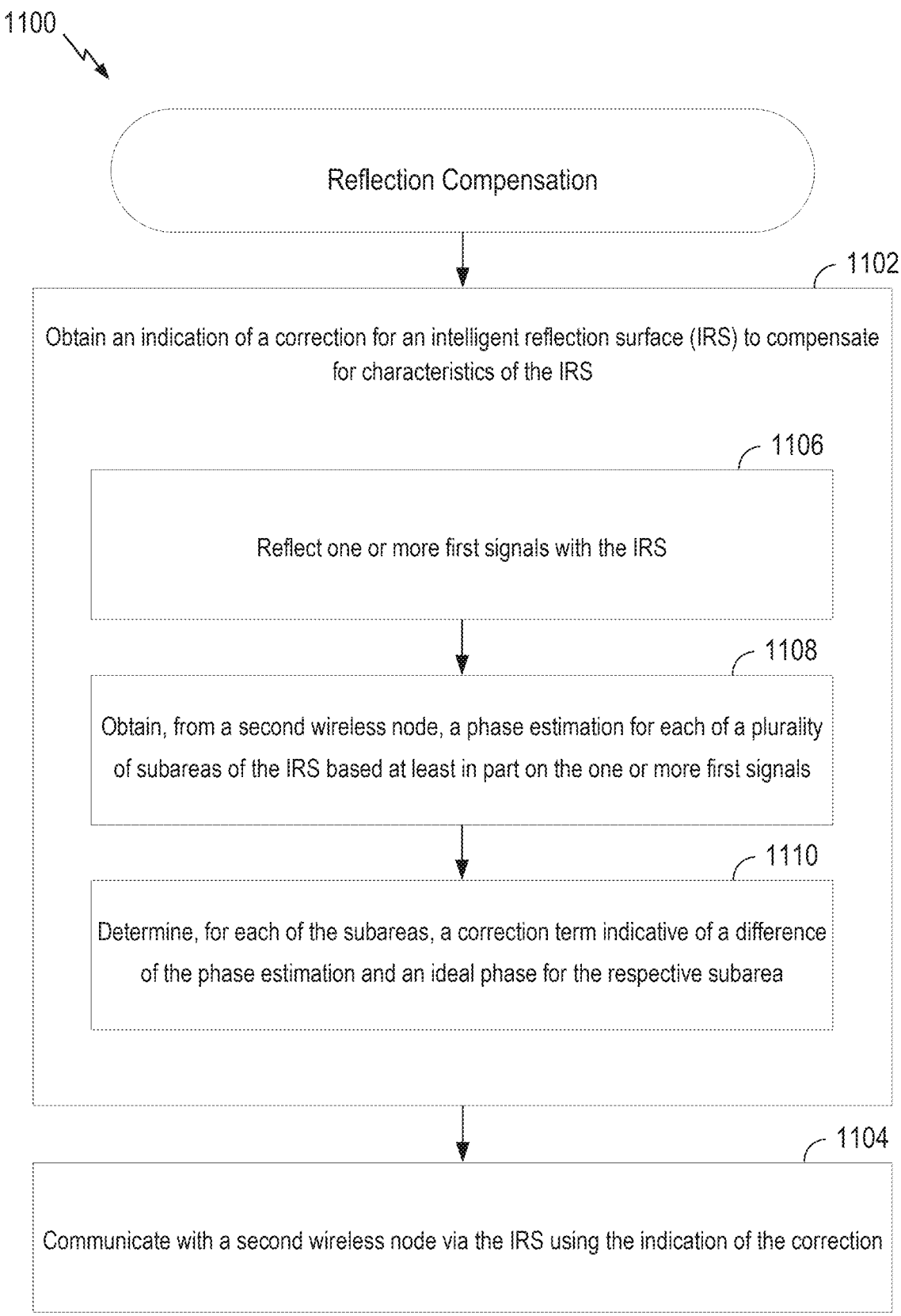
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a first wireless node (such as the BS 102, the UE 104, and/or the network entity 602 in the wireless communications network 600). The operations 1100 may be implemented as software components that are executed and run on one or more processors (e.g., controller/processor 240 of FIG. 2). Further, the transmission and reception of signals by the network entity in operations 1100 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, a wireless node may refer to a wireless communication device in a radio access network, such as a base station, a user equipment, a network entity, a remote radio head or antenna panel in communication with a base station, and/or network controller.

The operations 1100 may optionally begin, at block 1102, where the first wireless node (e.g., the BS 102) may obtain an indication of a correction for an IRS (e.g., the IRS 114) to compensate for one or more characteristics of the IRS. Obtaining the correction at block 1102 may involve determining the correction, receiving the correction, and/or accessing the correction from memory. In certain aspects, the first wireless node may determine the correction (e.g., correction terms), for example, as described herein with respect to FIG. 5. In some aspects, the first wireless node may receive the correction from the second wireless node or another wireless node. In certain aspects, the first wireless node may store the correction in memory and access the correction when the first wireless node configures a network entity with the IRS or communicates with a second wireless node via the IRS. The characteristics may include the IRS having a variation of a surface (e.g., a curved, flat, or conformal surface), the IRS having one or more imperfections on the surface, the IRS having a variation in an orientation, or any combination thereof, for example, as described herein with respect to FIG. 6.

At block 1104, the first wireless node may communicate with a second wireless node (e.g., the UE 104) via the IRS using the indication of the correction. In some cases, communicating with the second wireless may involve the first wireless node transmitting data signals to the second wireless node via the IRS as described herein with respect to FIGS. 1, 2, 4, and 6. In certain cases, communicating with the second wireless node may involve the first wireless node receiving data signals from the second wireless node via the IRS as described herein with respect to FIGS. 1, 2, 4, and 6. In some cases, communicating with the second wireless node may involve the first wireless node (e.g., the network entity 602) controlling the IRS to reflect signals from a third wireless node (e.g., the BS 102) towards the second wireless node (e.g., the UE 104). In certain aspects, a network entity (e.g., the network entity 602), which controls the IRS, may compensate for the characteristics of the IRS using the corrections terms in forming the reflection at the IRS. The BS 102 and/or UE 104 may provide the network entity with the correction (e.g., the correction terms), for example, as described herein with respect to FIG. 7.

The first wireless node may determine phase deviations for subareas of the IRS based on measurements obtained at the second wireless node. At block 1106, the first wireless node may reflect one or more first signals (e.g., reference signals) with the IRS. For example, the first wireless node may transmit the first signals, and the IRS may reflect the first signals to the second wireless node as depicted in FIG. 6. At block 1108, the first wireless node may obtain, from the second wireless node, a phase estimation for each of a plurality of subareas (e.g., the subareas 614) of the IRS based at least in part on the one or more first signals. At block 1110, the first wireless node may determine, for each of the subareas, the correction (e.g., a correction term) indicative of a difference of the phase estimation and an ideal phase for the respective subarea and/or indicative of a rotation matrix for the respective subarea. In certain aspects, the first wireless node may determine, for each of the subareas, the correction based on an interpolation (or average) of a plurality of differences of the phase estimations and ideal phases for the subareas. The correction (e.g., the correction terms) may be determined using an interpolation of the phase differences or average phase difference over multiple subareas for smoothing or filtering.

In certain aspects, the reflections from the IRS may be focused to the second wireless node, for example, as described herein with respect to FIG. 8A. The first wireless node may focus the first signals to the second wireless node with the IRS. For certain aspects, the reflections from the IRS may be defocused, for example, as described herein with respect to FIG. 8B. The first wireless node may defocus the first signals to the second wireless node with the IRS. For example, the first wireless node may send, to the IRS controller (e.g., network entity 602), control signaling indicating to focus or defocus the reflections to the second wireless node. The first wireless node may provide an angle of departure and/or beam pattern for the IRS to use in forming the reflections to the second wireless node.

For certain aspects, the reflections from the IRS may sweep through the subareas over time. For example, the IRS may use each of the subareas (or a subset of subareas) at a different time to reflect the first signals to the second wireless node. The first wireless node may reflect, from each of the subareas of the IRS to the second wireless node, a portion of the first signals in a different occasion (e.g., one or more symbols) for the respective subarea. In certain aspects, the IRS may use an orthogonal cover to reflect the signals to the second wireless node, for example, as described herein with respect to FIG. 9. The first wireless node may reflect, from each of the subareas of the IRS, the first signals with a phase shift determined based on a corresponding element of an orthogonal matrix (e.g., an Hadamard matrix) associated with the respective subarea and/or occasion (symbol index). The first wireless node may reflect, from each of the subareas of the IRS, the first signals with a focused or a defocused reflection pattern for the respective subarea. In some cases, the orthogonal cover may be superimposed on a surface phase for focusing or defocusing the radiation patterns of the subareas towards the UE. In certain cases, the orthogonal cover may be superimposed on a surface phase for beamforming with the same direction and/or the same beam shape for the subareas. The first wireless node may send, to the IRS controller, control signaling indicating to activate the subareas one at a time or at the same time, for example, using the orthogonal cover for the reflections to the second wireless node over time.

In certain aspects, the ideal phase for the subareas of the IRS may be computed, estimated, and/or measured, for example, as described herein with respect to FIG. 5. The first wireless node may reflect, with the IRS, one or more second signals focused on the second wireless node, for example, in a direction aimed at or focused on the second wireless node. The first wireless node may obtain a measured phase for the IRS from the second wireless node, where the measured phase may be indicative of the ideal phases for the subareas of the IRS. In certain aspects, the first wireless node may determine, for each of the subareas, the ideal phase based at least in part on a position of the second wireless node and a virtual focal point associated with a radiation/reflection pattern of the respective subarea. For example, the first wireless node may determine the ideal (expected) phase for each subarea using Expression (1).

For certain aspects, the first wireless node may determine the correction (e.g., correction terms) during UE positioning as described herein with respect to FIG. 5. For example, the first wireless node may obtain, from the second wireless node, an angle of departure (or angle of arrival) for each of a plurality of subareas of the IRS based at least in part on the first signals. The first wireless node may determine, for each of the subareas, a rotation matrix, or, equivalently, a rotation axis and angle, indicative of a difference of the angle of departure and an ideal angle of departure for the respective subarea, where the correction may include the rotation matrices, or rotation axes and angles. In certain aspects, the first wireless node may determine the rotation matrix based on an interpolation (or an average) of a plurality of differences of the angles of departure and ideal angles of departure for the subareas.

The indication of the correction may include phase corrections for a plurality of subareas of the IRS, rotation matrices for the subareas of the IRS, or a combination thereof. The indication of the correction may include certain correction information and/or certain correction term(s), such as a phase correction or a rotation matrix. The correction information and/or correction terms may include one or more terms specific to a subarea, a reflecting element, a reflection (or radiation) pattern (e.g., shape or width), or a reflection orientation (e.g., azimuth and/or elevation) of an IRS.

The first wireless node may determine a phase for a reflection coefficient for each of a plurality of reflecting elements of the IRS. To communicate with the second wireless node, the first wireless node may determine a phase for a reflection coefficient for each of a plurality of reflecting elements of the IRS, and the first wireless node may configure the IRS to apply, for each of the subareas, a correction term to the phases of the reflecting elements associated with the respective subarea. In certain aspects, the first wireless node may determine a direction from each of a plurality of reflecting elements of the IRS to the second wireless node, and the first wireless node may configure the IRS to apply, for each of the subareas, one of the rotation matrices to the directions of the reflecting elements associated with the respective subarea. For example, the IRS may adjust the angle-of-arrival and/or angle-of-departure associated with each of the subareas of the IRS using the corresponding rotation matrix.

While the examples depicted in FIGS. 1-11 are described herein with respect to 5G NR systems and mmWave bands to facilitate understanding, aspects of the present disclosure may also be applied to other radio access technologies and/or other frequency bands.

Example Wireless Communication Devices

Figure 12:
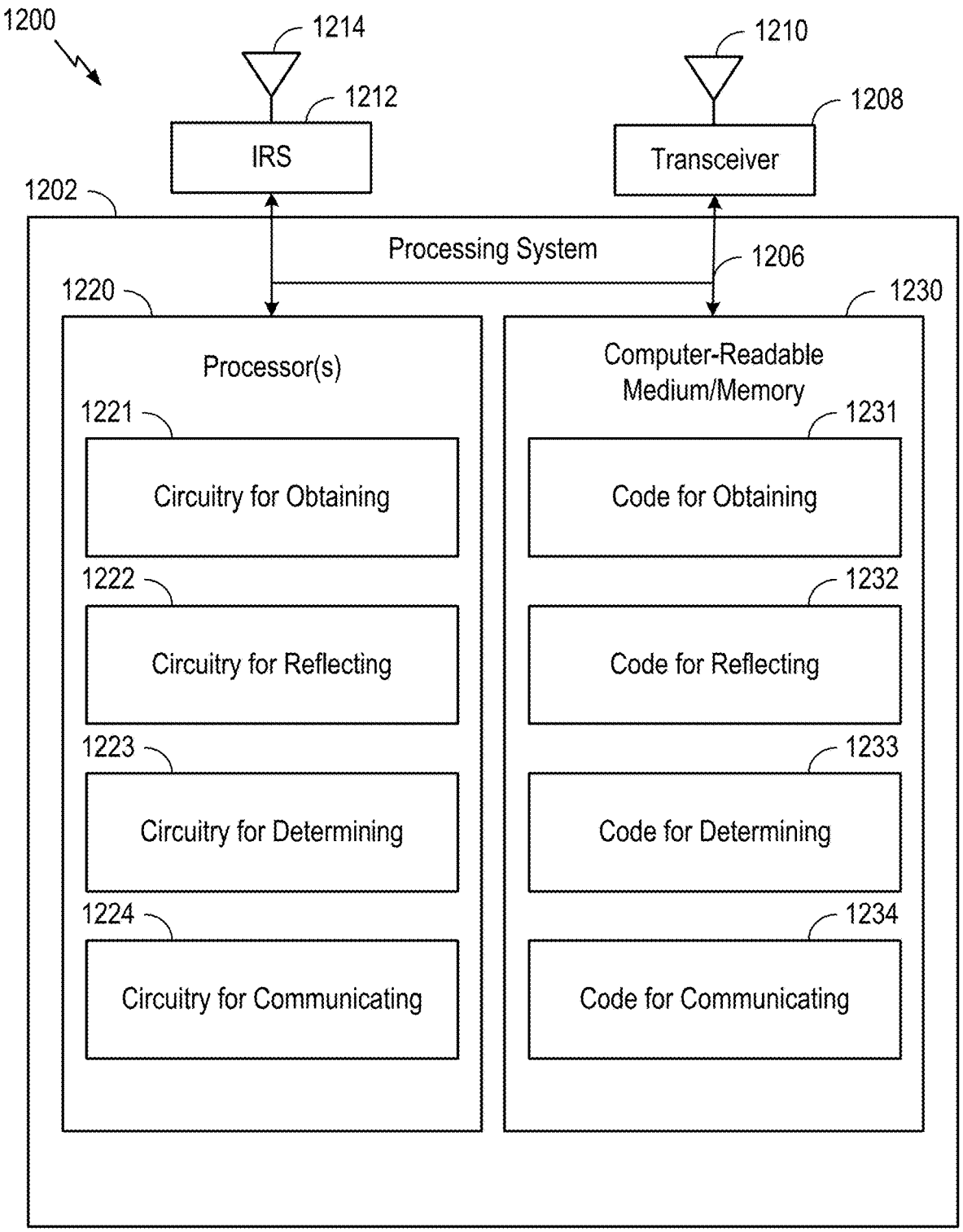
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 5-11. In some examples, communication device 1200 may be a base station 102 or any other suitable wireless communication device, for example, as described herein with respect to FIGS. 1, 2, and 6.

Communications device 1200 includes a processing system 1202 coupled to a transceiver 1208 (e.g., a transmitter and/or a receiver) and/or an IRS 1212 (e.g., a reflectarray and/or a metasurface). Transceiver 1208 is configured to transmit (or send) and receive signals for the communications device 1200 via an antenna 1210, such as the various signals as described herein. The IRS 1212 is configured to reflect and/or re-radiate signals for the communications device 1200 via an element 1214, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 5-11, or other operations for performing the various techniques discussed herein for compensating for characteristic(s) of an intelligent reflecting surface.

In the depicted example, computer-readable medium/memory 1230 stores code 1231 for obtaining, code 1232 for reflecting, code 1233 for determining, and/or code 1234 for communicating (e.g., transmitting and/or receiving).

In the depicted example, the one or more processors 1220 include circuitry configured to implement the code stored in the computer-readable medium/memory 1230, including circuitry 1221 for obtaining, circuitry 1222 for reflecting, circuitry 1223 for determining, and/or circuitry 1224 for communicating (e.g., transmitting and/or receiving).

Various components of communications device 1200 may provide means for performing the methods described herein, including with respect to FIGS. 5-11.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for reflecting and/or means for determining may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including reflection imperfection compensation component 241).

Notably, FIG. 12 is an example, and many other examples and configurations of communication device 1200 are possible.

Example Aspects

Implementation examples are described in the following numbered clauses:

Aspect 1: A method of wireless communication by a first wireless node, comprising: obtaining an indication of a correction for an intelligent reflecting surface (IRS) to compensate for one or more characteristics of the IRS; and communicating with a second wireless node via the IRS using the indication of the correction.

Aspect 2: The method of Aspect 1, wherein: the one or more characteristics of the IRS include: the IRS having a first variation of a surface, the IRS having an imperfection on the surface, the IRS having a second variation in an orientation, or any combination thereof; and the indication of the correction includes: phase corrections for a plurality of subareas of the IRS, rotation matrices for the subareas of the IRS, or any combination thereof.

Aspect 3: The method of Aspect 2, wherein communicating with the second wireless node comprises: determining a phase for a reflection coefficient for each of a plurality of reflecting elements of the IRS; and applying, for each of the subareas, the indication of the correction to the phases of the reflecting elements associated with the respective subarea.

Aspect 4: The method of Aspect 2 or 3, wherein communicating with the second wireless node comprises: determining a direction from each of a plurality of reflecting elements of the IRS to the second wireless node; and applying, for each of the subareas, one of the rotation matrices to the directions of the reflecting elements associated with the respective subarea.

Aspect 5: The method according to any of Aspects 1-4, further comprising: reflecting one or more first signals with the IRS; obtaining, from the second wireless node, a phase estimation for each of a plurality of subareas of the IRS based at least in part on the one or more first signals; and wherein obtaining the indication of the correction comprises determining, for each of the subareas, a correction term indicative of a difference of the phase estimation and an ideal phase for the respective subarea.

Aspect 6: The method of Aspect 5, wherein determining the correction term comprises determining, for each of the subareas, the correction term based on an interpolation of a plurality of differences of the phase estimations and ideal phases for the subareas.

Aspect 7: The method of Aspect 5 or 6, wherein reflecting the one or more first signals comprises focusing the one or more first signals to the second wireless node with the IRS.

Aspect 8: The method according to any of Aspects 5-7, wherein reflecting the one or more first signals comprises defocusing the one or more first signals to the second wireless node with the IRS.

Aspect 9: The method according to any of Aspects 5-8, wherein reflecting the one or more first signals comprises reflecting, from each of the subareas of the IRS to the second wireless node, a portion of the one or more first signals in a different occasion for the respective subarea.

Aspect 10: The method according to any of Aspects 5-9, wherein reflecting the one or more first signals comprises reflecting, from each of the subareas of the IRS, the one or more first signals with a phase shift determined based on a corresponding element of an orthogonal matrix associated with the respective subarea and a symbol index.

Aspect 11: The method of Aspect 10, wherein reflecting the one or more first signals comprises reflecting, from each of the subareas of the IRS, the one or more first signals with a focused or a defocused reflection pattern for the respective subarea.

Aspect 12: The method according to any of Aspects 5-11, further comprising: reflecting one or more second signals in a direction focused on the second wireless node; and obtaining a measured phase for the IRS from the second wireless node, wherein the measured phase is indicative of the ideal phases.

Aspect 13: The method according to any of Aspects 5-12, further comprising determining, for each of the subareas, the ideal phase based at least in part on a position of the second wireless node and a virtual focal point associated with a radiation pattern of the respective subarea.

Aspect 14: The method according to any of Aspects 1-4, further comprising: reflecting one or more first signals from the IRS; obtaining, from the second wireless node, an angle of departure for each of a plurality of subareas of the IRS based at least in part on the one or more first signals; and wherein obtaining the indication of the correction comprises determining, for each of the subareas, a rotation matrix indicative of a difference of the angle of departure and an ideal angle of departure for the respective subarea.

Aspect 15: The method of Aspect 14, wherein determining the rotation matrix comprises determining the rotation matrix based on an interpolation of a plurality of differences of the angles of departure and ideal angles of departure for the subareas.

Aspect 16: An apparatus for wireless communication, comprising: a memory; and a processor coupled to the memory, the processor and the memory being configured to: obtain an indication of a correction for an intelligent reflecting surface (IRS) to compensate for one or more characteristics of the IRS, and communicate with a second wireless node via the IRS using the indication of the correction.

Aspect 17: The apparatus of Aspect 16, wherein: the one or more characteristics of the IRS include: the IRS having a first variation of a surface, the IRS having one or more imperfections of the surface, the IRS having a second variation in an orientation, or any combination thereof; and the indication of the correction includes: phase corrections for a plurality of subareas of the IRS, rotation matrices for the subareas of the IRS, or any combination thereof.

Aspect 18: The apparatus of Aspect 17, wherein the processor and the memory are further configured to: determine a phase for a reflection coefficient for each of a plurality of reflecting elements of the IRS; and apply, for each of the subareas, the indication of the correction to the phases of the reflecting elements associated with the respective subarea.

Aspect 19: The apparatus of Aspect 17 or 18, wherein the processor and the memory are further configured to: determine a direction from each of a plurality of reflecting elements of the IRS to the second wireless node; and apply, for each of the subareas, one of the rotation matrices to the directions of the reflecting elements associated with the respective subarea.

Aspect 20: The apparatus according to any of Aspects 16-19, the processor and the memory are further configured to: reflect one or more first signals with the IRS; obtain, from the second wireless node, a phase estimation for each of a plurality of subareas of the IRS based at least in part on the one or more first signals; and determine, for each of the subareas, a correction term indicative of a difference of the phase estimation and an ideal phase for the respective subarea.

Aspect 21: The apparatus of Aspect 20, wherein the processor and the memory are further configured to determine, for each of the subareas, the correction term based on an interpolation of a plurality of differences of the phase estimations and ideal phases for the subareas.

Aspect 22: The apparatus of Aspect 20 or 21, wherein the processor and the memory are further configured to focus the one or more first signals to the second wireless node with the IRS.

Aspect 23: The apparatus according to any of Aspects 20-22, wherein the processor and the memory are further configured to defocus the one or more first signals to the second wireless node with the IRS.

Aspect 24: The apparatus according to any of Aspects 20-23, wherein the processor and the memory are further configured to reflect, from each of the subareas of the IRS to the second wireless node, a portion of the one or more first signals in a different occasion for the respective subarea.

Aspect 25: The apparatus according to any of Aspects 20-24, wherein the processor and the memory are further configured to reflect, from each of the subareas of the IRS, the one or more first signals with a phase shift determined based on a corresponding element of an orthogonal matrix associated with the respective subarea and a symbol index.

Aspect 26: The apparatus of Aspect 25, wherein the processor and the memory are further configured to reflect, from each of the subareas of the IRS, the one or more first signals with a focused or a defocused reflection pattern for the respective subarea.

Aspect 27: The apparatus according to any of Aspect 20-26, wherein the processor and the memory are further configured to: reflect one or more second signals in a direction focused on the second wireless node; and obtain a measured phase for the IRS from the second wireless node, wherein the measured phase is indicative of the ideal phases.

Aspect 28: The apparatus according to any of Aspects 20-27, wherein the processor and the memory are further configured to determine, for each of the subareas, the ideal phase based at least in part on a position of the second wireless node and a virtual focal point associated with a radiation pattern of the respective subarea.

Aspect 29: The apparatus according to any of Aspects 16-19, wherein the processor and the memory are further configured to: reflect one or more first signals from the IRS; obtain, from the second wireless node, an angle of departure for each of a plurality of subareas of the IRS based at least in part on the one or more first signals; and determine, for each of the subareas, a rotation matrix indicative of a difference of the angle of departure and an ideal angle of departure for the respective subarea.

Aspect 30: The apparatus of Aspect 29, wherein the processor and the memory are further configured to determine the rotation matrix based on an interpolation of a plurality of differences of the angles of departure and ideal angles of departure for the subareas.

Aspect 31: An apparatus, comprising: a memory comprising executable instructions; one or more processors configured to execute the executable instructions and cause the apparatus to perform a method in accordance with any of Aspects 1-15.

Aspect 32: An apparatus, comprising means for performing a method in accordance with any of Aspects 1-15.

Aspect 33: A non-transitory computer-readable medium comprising executable instructions that, when executed by one or more processors of an apparatus, cause the apparatus to perform a method in accordance with any of Aspects 1-15.

Aspect 34: A computer program product embodied on a computer-readable storage medium comprising code for performing a method in accordance with any of Aspects 1-15.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of wirelessly communicating with an intelligent reflecting surface in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. In some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a first wireless node, the method comprising:
    obtaining an indication of a correction for an intelligent reflecting surface (IRS) to compensate for one or more characteristics of the IRS, wherein the one or more characteristics comprise surface imperfections of the TRS; and
    communicating with a second wireless node via the IRS using the indication of the correction.

2. The method of claim 1, wherein:
    the one or more characteristics of the IRS further comprise:
        the IRS having a first variation of a surface,
        the IRS having a second variation in an orientation, or any combination thereof, and
    the indication of the correction includes:
        phase corrections for a plurality of subareas of the IRS,
        rotation matrices for the subareas of the IRS, or
        any combination thereof.

3. The method of claim 2, wherein communicating with the second wireless node comprises:
    determining a phase for a reflection coefficient for each of a plurality of reflecting elements of the TRS; and
    applying, for each of the subareas, the indication of the correction to the phases of the reflecting elements associated with the respective subarea.

4. The method of claim 2, wherein communicating with the second wireless node comprises:
    determining a direction from each of a plurality of reflecting elements of the IRS to the second wireless node; and applying, for each of the subareas, one of the rotation matrices to the directions of the reflecting elements associated with the respective subarea.

5. The method of claim 1, further comprising:
reflecting one or more first signals with the IRS;
obtaining, from the second wireless node, a phase estimation for each of a plurality of subareas of the IRS based at least in part on the one or more first signals; and
wherein obtaining the indication of the correction comprises determining, for each of the subareas, a correction term indicative of a difference of the phase estimation and an ideal phase for the respective subarea.

6. The method of claim 5, wherein determining the correction term comprises determining, for each of the subareas, the correction term based on an interpolation of a plurality of differences of the phase estimations and ideal phases for the subareas.

7. The method of claim 5, wherein reflecting the one or more first signals comprises focusing the one or more first signals to the second wireless node with the IRS.

8. The method of claim 5, wherein reflecting the one or more first signals comprises defocusing the one or more first signals to the second wireless node with the IRS.

9. The method of claim 5, wherein reflecting the one or more first signals comprises reflecting, from each of the subareas of the IRS to the second wireless node, a portion of the one or more first signals in a different occasion for the respective subarea.

10. The method of claim 5, wherein reflecting the one or more first signals comprises reflecting, from each of the subareas of the IRS, the one or more first signals with a phase shift determined based on a corresponding element of an orthogonal matrix associated with the respective subarea and a symbol index.

11. The method of claim 10, wherein reflecting the one or more first signals comprises reflecting, from each of the subareas of the IRS, the one or more first signals with a focused or a defocused reflection pattern for the respective subarea.

12. The method of claim 5, further comprising:
reflecting one or more second signals in a direction focused on the second wireless node; and
obtaining a measured phase for the IRS from the second wireless node, wherein the measured phase is indicative of the ideal phases.

13. The method of claim 5, further comprising determining, for each of the subareas, the ideal phase based at least in part on a position of the second wireless node and a virtual focal point associated with a radiation pattern of the respective subarea.

14. The method of claim 1, further comprising:
reflecting one or more first signals from the IRS;
obtaining, from the second wireless node, an angle of departure for each of a plurality of subareas of the IRS based at least in part on the one or more first signals; and
wherein obtaining the indication of the correction comprises determining, for each of the subareas, a rotation matrix indicative of a difference of the angle of departure and an ideal angle of departure for the respective subarea.

15. The method of claim 14, wherein determining the rotation matrix comprises determining the rotation matrix based on an interpolation of a plurality of differences of the angles of departure and ideal angles of departure for the subareas.

16. An apparatus for wireless communication, the apparatus comprising:
a memory storing computer executable code; and
a processor coupled to the memory, the processor and the memory being configured to execute the computer executable code and cause the apparatus to:
obtain an indication of a correction for an intelligent reflecting surface (IRS) to compensate for one or more characteristics of the IRS, wherein the one or more characteristics comprise surface imperfections of the IRS, and
communicate with a second wireless node via the IRS using the indication of the correction.

17. The apparatus of claim 16, wherein:
the one or more characteristics of the IRS further comprise:
the IRS having a first variation of a surface,
the IRS having a second variation in an orientation, or any combination thereof, and
the indication of the correction includes:
phase corrections for a plurality of subareas of the IRS,
rotation matrices for the subareas of the IRS, or
any combination thereof.

18. The apparatus of claim 17, wherein the processor and the memory are further configured to cause the apparatus to:
determine a phase for a reflection coefficient for each of a plurality of reflecting elements of the IRS; and
apply, for each of the subareas, the indication of the correction to the phases of the reflecting elements associated with the respective subarea.

19. The apparatus of claim 17, wherein the processor and the memory are further configured to cause the apparatus to:
determine a direction from each of a plurality of reflecting elements of the IRS to the second wireless node; and
apply, for each of the subareas, one of the rotation matrices to the directions of the reflecting elements associated with the respective subarea.

20. The apparatus of claim 16, the processor and the memory are further configured to cause the apparatus to:
reflect one or more first signals with the IRS;
obtain, from the second wireless node, a phase estimation for each of a plurality of subareas of the IRS based at least in part on the one or more first signals; and
determine, for each of the subareas, a correction term indicative of a difference of the phase estimation and an ideal phase for the respective subarea.

21. The apparatus of claim 20, wherein the processor and the memory are further configured to cause the apparatus to determine, for each of the subareas, the correction term based on an interpolation of a plurality of differences of the phase estimations and ideal phases for the subareas.

22. The apparatus of claim 20, wherein the processor and the memory are further configured to cause the apparatus to focus the one or more first signals to the second wireless node with the IRS.

23. The apparatus of claim 20, wherein the processor and the memory are further configured to cause the apparatus to defocus the one or more first signals to the second wireless node with the IRS.

24. The apparatus of claim 20, wherein the processor and the memory are further configured to cause the apparatus to reflect, from each of the subareas of the IRS to the second wireless node, a portion of the one or more first signals in a different occasion for the respective subarea.

25. The apparatus of claim 20, wherein the processor and the memory are further configured to cause the apparatus to reflect, from each of the subareas of the IRS, the one or more first signals with a phase shift determined based on a corresponding element of an orthogonal matrix associated with the respective subarea and a symbol index.

26. The apparatus of claim 25, wherein the processor and the memory are further configured to cause the apparatus to reflect, from each of the subareas of the IRS, the one or more first signals with a focused or a defocused reflection pattern for the respective subarea.

27. The apparatus of claim 20, wherein the processor and the memory are further configured to cause the apparatus to:
reflect one or more second signals in a direction focused on the second wireless node; and
obtain a measured phase for the IRS from the second wireless node, wherein the measured phase is indicative of the ideal phases.

28. The apparatus of claim 20, wherein the processor and the memory are further configured to cause the apparatus to determine, for each of the subareas, the ideal phase based at least in part on a position of the second wireless node and a virtual focal point associated with a radiation pattern of the respective subarea.

29. The apparatus of claim 16, wherein the processor and the memory are further configured to cause the apparatus to
reflect one or more first signals from the IRS;
obtain, from the second wireless node, an angle of departure for each of a plurality of subareas of the IRS based at least in part on the one or more first signals; and
determine, for each of the subareas, a rotation matrix indicative of a difference of the angle of departure and an ideal angle of departure for the respective subarea.

30. The apparatus of claim 29, wherein the processor and the memory are further configured to cause the apparatus to determine the rotation matrix based on an interpolation of a plurality of differences of the angles of departure and ideal angles of departure for the subareas.

* * * * *